United States Patent [19]

Tekeguchi

[11] Patent Number: 5,423,511
[45] Date of Patent: Jun. 13, 1995

[54] POWER UNIT MOUNTING DEVICE FOR AUTOMOTIVE VEHICLE

[75] Inventor: Hajime Tekeguchi, Kanagawa, Japan

[73] Assignee: Nissan Motor Co., Ltd., Yokohama, Japan

[21] Appl. No.: 977,458

[22] Filed: Nov. 17, 1992

[30] Foreign Application Priority Data

Dec. 20, 1991 [JP] Japan .................. 3-338799

[51] Int. Cl.$^6$ ........................... F16M 11/00
[52] U.S. Cl. ..................... 248/550; 248/638
[58] Field of Search ......... 248/550, 636, 638, 631, 248/634, 621; 267/218, 219, 35, 140.15, 140.14, 123; 180/300, 902, 312

[56] References Cited

U.S. PATENT DOCUMENTS

| | | | |
|---|---|---|---|
| 4,648,576 | 3/1987 | Matsui | 248/550 |
| 4,650,170 | 3/1987 | Fukushima | 267/219 X |
| 4,671,227 | 6/1987 | Hollerweger et al. | 248/550 X |
| 4,700,933 | 10/1987 | Chikamori et al. | 248/550 X |
| 4,793,599 | 12/1988 | Ishioka | 248/550 X |
| 4,802,648 | 2/1989 | Decker et al. | 248/550 |
| 4,858,899 | 8/1989 | Saotome et al. | 267/141.4 X |
| 4,969,632 | 11/1990 | Hodgson et al. | 267/219 X |
| 5,076,550 | 12/1991 | Mayama et al. | 267/219 X |

FOREIGN PATENT DOCUMENTS

| | | |
|---|---|---|
| 0173273A | 3/1986 | European Pat. Off. . |
| 0216082A | 4/1987 | European Pat. Off. . |
| 0248942A | 12/1987 | European Pat. Off. . |
| 0278824 | 8/1988 | European Pat. Off. ............ 267/219 |
| 63-123845 | 8/1988 | Japan . |
| 2228551 | 1/1990 | United Kingdom . |
| 2240606 | 8/1991 | United Kingdom . |

*Primary Examiner*—Karen J. Chotkowski
*Attorney, Agent, or Firm*—Lowe, Price, LeBlanc & Becker

[57] ABSTRACT

A power unit mounting device for an automotive vehicle is provided which serves to damp vibration transmitted from a power unit to a vehicle chassis. The power unit mounting device includes generally a plurality of working chambers filled with a working fluid, an actuator operable to adjust transmission of vibration between the working chambers which is inputted from the power unit through the working fluid for varying damping characteristics exhibited by the power unit mounting device, and a bracket supporting the power unit mounting device on the vehicle chassis. The bracket is so arranged as to surround the actuator for increasing freedom in installation of the mounting device on the vehicle chassis and for protecting the actuator against radiant heat from the engine and/or an exhaust pipe.

14 Claims, 3 Drawing Sheets

POWER UNIT MOUNTING DEVICE FOR AUTOMOTIVE VEHICLE

BACKGROUND OF THE INVENTION

1. Field of the Invention

The present invention relates generally to a mounting device for supporting a power unit including an engine of an automotive vehicle. The mounting device is adapted for damping transmission of vibration over a wide frequency range. More particularly, the invention is directed to a mounting device having improved geometry which provides easy installation and high heat resistance.

2. Description of the Prior Art

Japanese Utility Model First Publication No. 63-123845 discloses a conventional power unit mounting device for an automotive vehicle which is designed to support a power unit on a vehicle chassis. This power unit mounting device comprises an elastic supporting member defining a main working chamber, a diaphragm defining an auxiliary working chamber, and an orifice passage fluidly communicating between the main and auxiliary working chambers. The main and auxiliary working chambers are respectively variable of volume due to elastic distortion of the elastic supporting member and the diaphragm. By changing a cross-sectional area of the orifice passage according to frequency of input vibration from the power unit, vibration may be attenuated in a number of different frequency ranges.

With this arrangement, when input vibration falls in a high frequency engine idle range, increasing the cross-sectional area of the orifice passage causes the mounting device to assume a lower dynamic spring constant suitable for absorbing the high frequency vibration, while when the input vibration fails in a low frequency engine shake range with high amplitude, decreasing the cross-sectional area of the orifice passage provides a high dynamic spring constant exhibiting high damping characteristics.

However, the above prior art power unit mounting device encounters a drawback in that an actuator which serves to vary a cross-sectional area of the orifice passage is arranged outside the mounting device and thus the device geometry makes installation on different types of vehicles difficult. Additionally, the mounting device is subject to radiant heat from an engine and/or an exhaust pipe, resulting in heat resistance being deteriorated.

SUMMARY OF THE INVENTION

It is therefore a principal object of the present invention to avoid the disadvantages of the prior art.

It is another object of the present invention to provide a power unit mounting device which assumes high heat resistance and has a geometry which facilitates easy installation.

According to one aspect of the present invention, there is provided a power unit mounting device for an automotive vehicle which serves to damp vibration transmitted from a power unit to a vehicle chassis. This mounting device comprises a plurality of working chambers filled with a working fluid, an actuator operable to adjust transmission of vibration between said working chambers which is inputted from the power unit through the working fluid for varying damping characteristics exhibited by the power unit mounting device, and a bracket supporting the power unit mounting device on the vehicle chassis, the bracket being so arranged as to surround the actuator.

In the preferred mode, the plurality of working chambers may be provided with main, first auxiliary, and second auxiliary working chambers. The main working chamber is fluidly communicated with the first and second auxiliary working chambers through a fluid passage respectively. The actuator includes valve means and a solenoid. The solenoid is responsive to a control signal from a controller to operate the valve means for selectively establishing and blocking fluid communication between the fluid passage and the second auxiliary working chamber. Additionally, the main and first auxiliary working chambers may be defined by an elastic body which is disposed within a mounting device casing. The second auxiliary working chamber is arranged outside the mounting device casing and surrounded by the bracket.

DESCRIPTION OF THE PREFERRED EMBODIMENT

Figure 1:
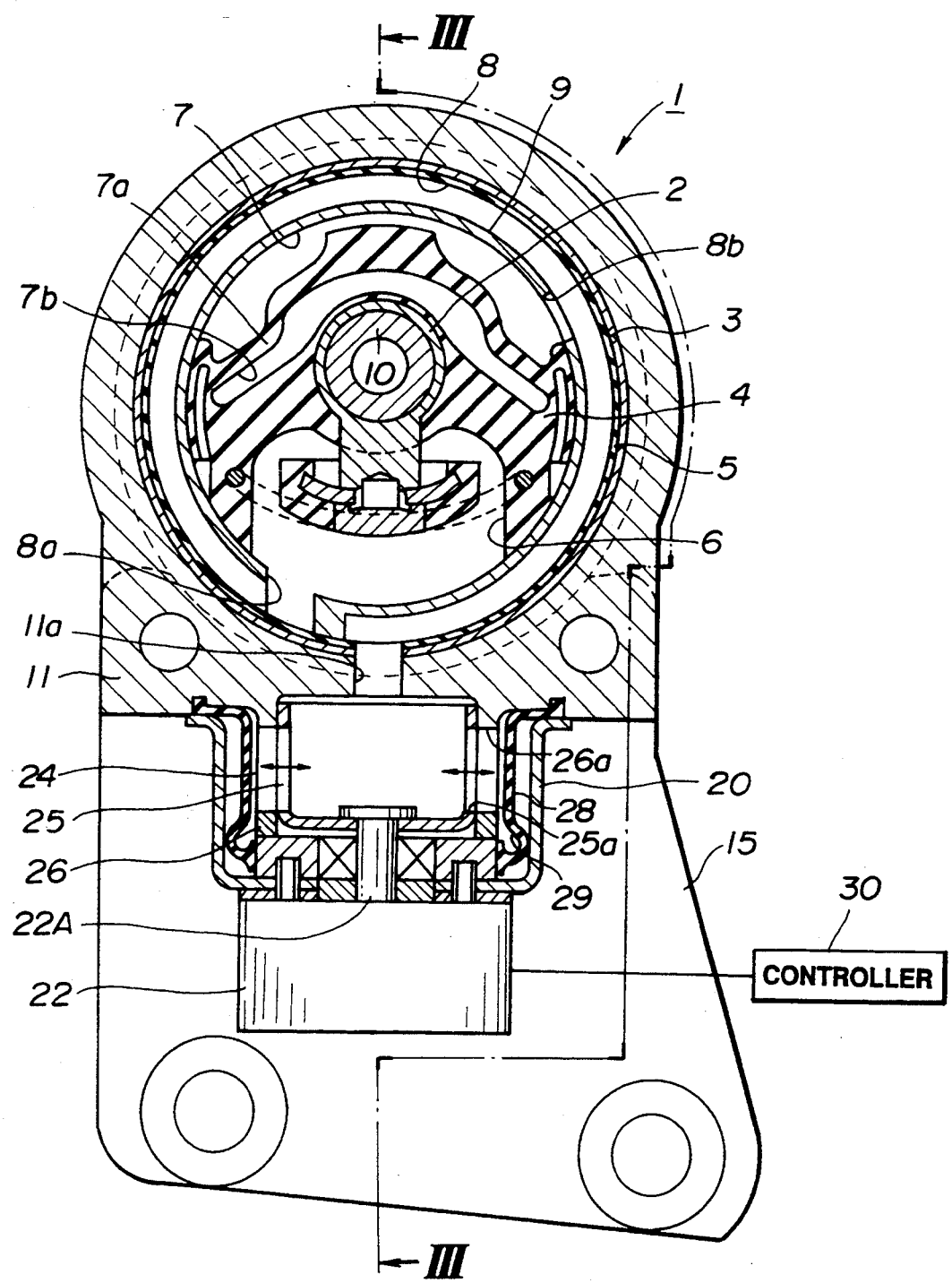
FIGS. 1 and 2 are front sectional elevations taken along the line I—I in FIG. 3 which show a power unit mounting device according to the present invention.
Figure 2:
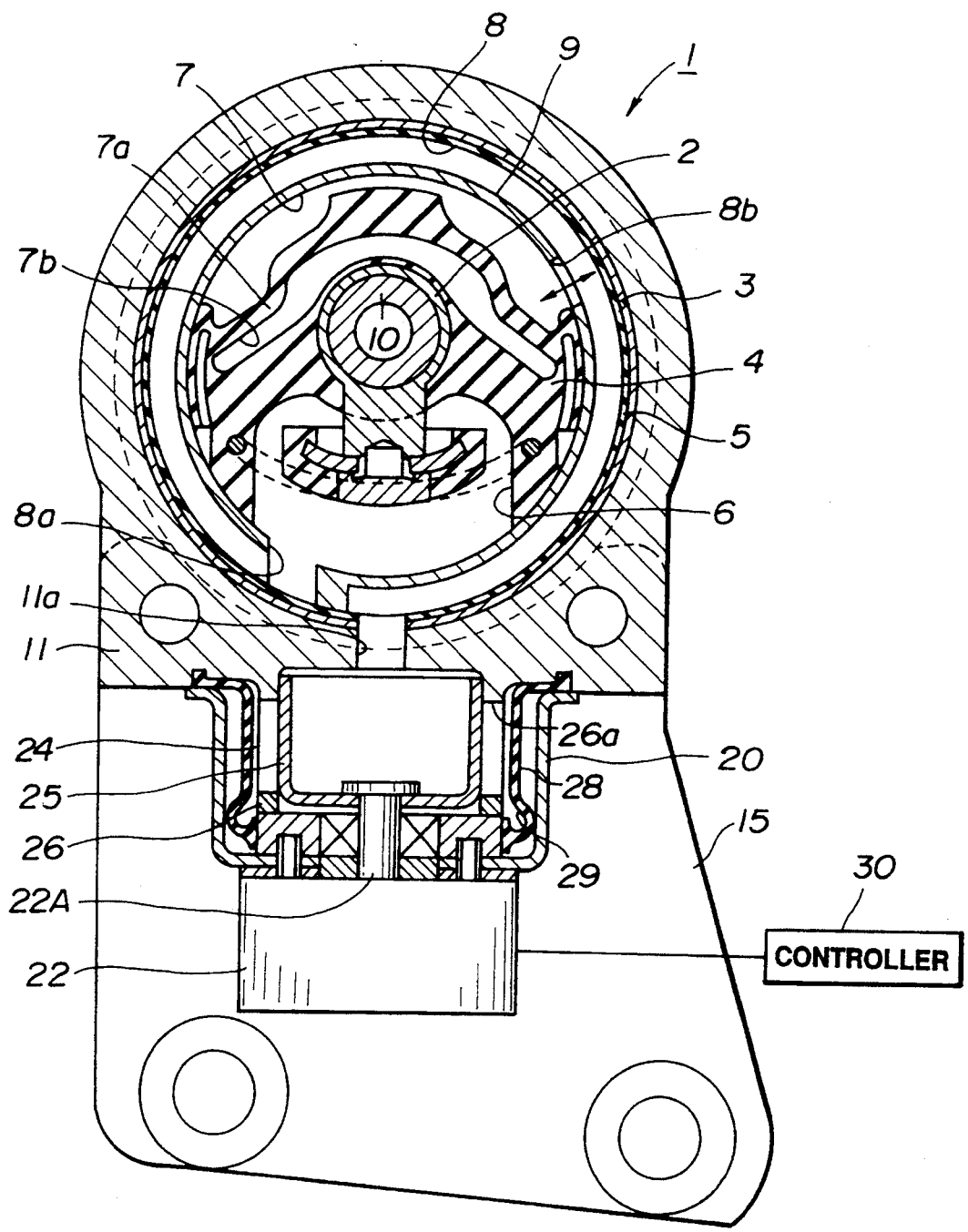
Figure 3:
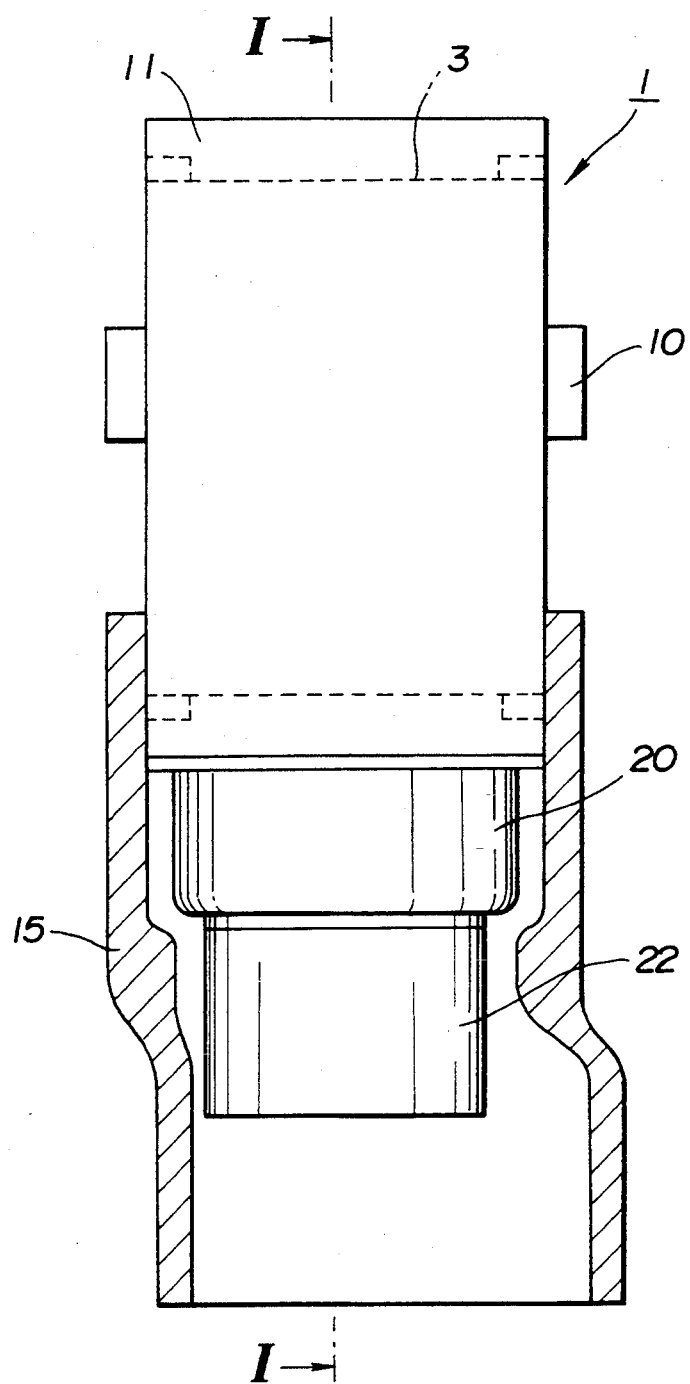
FIG. 3 is a side elevation taken along the line III—III in FIG. 1.

FIGS. 1 to 3 show constructional features of a power unit mount 1 for supporting a power unit including an engine (not shown) according to the present invention. As shown, the power unit mount 1 includes generally an inner tubular member 2, an outer tubular member 3, an elastomeric body 4 which is disposed between the inner and outer tubular members. The inner periphery of the elastomeric body 4 is permanently fixed to the outer periphery of the inner tubular member 2. The outer tubular member 3 has an elastomeric layer 5 attached to its inner periphery via vulcanization or the like. The outer periphery of the elastomeric body 4 is press-fitted to the inner periphery of the elastomeric layer 5.

Suitably shaped cavities define main, first auxiliary, and air working chambers 6, 7, and 7b in a mid section of the elastomeric body 4 in a longitudinal direction. A flexible diaphragm 7a hermetically separates the first auxiliary working chamber 7 and air chambers 7b. The air chamber 7b is arranged to have both ends open to the ambient atmosphere.

A hollow cylindrical member 9 covers a mid outer peripheral portion of the elastomeric body 4 to define an annular passage 8 between same and the outer tubular member 3 as well as the main and first auxiliary working chambers 6 and 7 between the cylindrical member 9 same and the elastomeric body 4. The cylindrical member 9 has an opening 8a which communicates between the annular passage 8 and the main working chamber 6 and an opening 8b which communicates between the annular passage 8 and the first auxiliary working chamber 7.

Inserted into the inner tubular member 2 is a shaft 10 which is attached to the power unit (not shown).

The outer tubular member 3 is press-fitted into a casing 11 which is in turn fixed to a vehicle chassis (not shown) through a bracket 15.

The bracket 15 includes a box-shaped member which has an aperture in its upper surface into which a lower end portion of the casing 11 is press-fitted and then bolted to the bracket.

On the bottom of the casing 11, a box-shaped member, or casing 20 is installed which disposes a rotary solenoid 22 on its lower surface. An output shaft 22A of the rotary solenoid 22 is inserted into the casing 20.

In the casing 20, a rotary valve 24 is provided which includes a hollow cylindrical rotor 25 and a cylindrical member 26 surrounding the rotor. The rotor 25 is mechanically connected to the output shaft 22A of the rotary solenoid 22 and is operable to rotate according to rotation of the output shaft 22A. It will be noted that the casing 20 and the rotary solenoid 22 are, as can be seen in FIG. 3, arranged inside the bracket 15. The bracket 15 thus functions as a heat insulator for protecting the rotary solenoid 22 as well as the rotary valve 24 against heat radiated from an engine and/or an exhaust pipe.

The rotary valve 24 is adapted to selectively establish and block fluid communication between the inside and outside portions of the rotary valve at first and second valve positions respectively according to the rotation of the rotor 25. The first valve position is, as shown in FIG. 1, defined by coincidence of openings 25a formed in an outer surface of the rotor 25 with openings 26a formed in an outer surface of the cylindrical member 26. The second valve position is such that the openings 25a are shifted from the openings 26a completely.

An orifice passage 11a is formed in the casing 11 which fluidly communicates between the inside of the rotor 25 and the annular passage 8. A diaphragm 28 formed with an elastic member such as a rubber is provided in the casing 20 which wraps over the cylindrical member 26 to define a second auxiliary chamber 29 between the same and the cylindrical member 26. An air chamber which is communicated with the ambient atmosphere is defined between the diaphragm 28 and the casing 20.

The main working chamber, the first and second auxiliary working chambers, and the annular passage 8 are filled with a working fluid.

In the case of a four cylinder four cycle reciprocating type internal combustion engine, the main vibration to which the engine is subject is the secondary harmonic of engine rotation (20-30 Hz at 600-900 rpm), while in the case of a six cylinder engine, the third harmonic (30-45 Hz) of engine rotation is the predominant vibration which is generated.

Accordingly, the mass of the working fluid contained in the power unit mount 1, the expansion direction spring constant of the elastomeric body 4, and the resulting resonance frequency (35-50 Hz), of arrangement are selected so that a low dynamic spring constant is achieved in a range close to that of the appropriate harmonic when the engine is idling.

A controller 30 is arranged to receive data inputs from a vehicle speed sensor and/or an engine speed sensor (not shown) for determining whether vibration falls in a high frequency engine idle range or in a low frequency engine shake range. When the vibration fails in the engine idle range, the controller 30 outputs a control signal to the rotary solenoid 22 to be placed at the first valve position for establishing the fluid communication between the openings 25a of the rotor 25 and the openings 26a of the cylindrical member 26. Alternatively, when the vibration falls in the engine shake range, the second valve position is established to block the fluid communication between the openings 25a and 26a.

In operation, when vibration fails in the engine idle range, the relatively high frequency vibration is transmitted to the power unit mount 1 through the shaft 10. The elastomeric body 4 is thus distorted to vary the volume of the main working chamber 6, causing the working fluid in the annular passage 8 to fluctuate. In this instance, the working fluid in the first auxiliary working chamber 7 does not follow the fluid vibration of high frequency transmitted from the annular passage 8. However, as mentioned above, during idle modes of engine operation, the rotary solenoid 22 establishes the fluid communication between the openings 25a and 26a. Accordingly, the working fluid flows back and forth between the annular passage 8 and the second auxiliary working chamber 29 through the orifice passage 11a with the result that the pressure fluctuation in the main chamber 6 is absorbed by volume variation of the second auxiliary chamber 29.

It will be appreciated that when vibration in the engine idle range is input to the power unit mount 1, the power unit mount exhibits a lower dynamic spring constant, preventing the vibration from being transmitted from the power unit to the vehicle body. This results in vehicle body vibration being reduced greatly.

On the other hand, when vibration falls in the engine shake range, the volume of the main chamber 6 is changed at a high amplitude and a low frequency, causing the fluid in the annular passage 8 to fluctuate greatly. As mentioned above, during modes of operation when the engine shake is produced, the rotary valve 24 shifts the openings 25a from the openings 26a to block the fluid communication between the annular passage 8 and the second auxiliary working chamber 29. Thus, the working fluid in the annular chamber 8 flows back and forth to the first auxiliary working chamber 7 through the opening 8b so that the pressure fluctuation of the working fluid is greatly damped by flow resistance provided by the opening 8b functioning as an orifice. Therefore, the elastomeric body 4 is prevented from resonating with the power unit, resulting in the engine shake being reduced greatly.

With the above arrangement of the power unit mount 1, the rotary solenoid 22 is located inside the bracket 15 so that the overall size of the power unit mount 1 may be reduced to make installation of the power unit mount easier.

Additionally, the bracket 15, as already mentioned, functions as a heat insulator which protects the rotary solenoid 22 against heat radiated from an engine and/or an exhaust pipe. Thus, the heat resistance of the rotary solenoid 22 is greatly improved as compared with the prior art device. Further, the second auxiliary working chamber 29 is also located inside the bracket 15 and thus the overall volume of fluid chambers of the power unit mount 1 may be reduced, increasing design freedom.

Furthermore, as shown in the drawings, both the rotary solenoid 22 and the rotary valve 22 driven by the rotary solenoid are arranged with a small interval therebetween within the bracket 15. This arrangement simplifies a torque transfer between the rotary solenoid 22 and the rotary valve 22, resulting in greatly improved durability. In addition, the rotary valve 24 is provided with the rotor 25 and the cylindrical member 26 forming an inside wall of the second auxiliary working chamber 29 and the rotor 25 is connected directly to the output shaft 22A of the rotary solenoid 22. Therefore, the operating response of the rotary valve 24 is greatly improved so that switching operation between the first and second valve positions is carried out rapidly.

What is claimed is:

1. A power unit mounting device for an automotive vehicle for damping vibration transmitted from a power unit to a vehicle chassis, comprising:
    a first structure including a casing, a shaft extending in said casing and an elastomeric body disposed between said casing and said shaft, said elastomeric body having a plurality of fluid-filled working chambers in fluid communication with each other to damp a first predetermined vibration transmission, said shaft being connected to said power unit;
    a second structure including means defining a further fluid-filled working chamber in communication with one of said fluid-filled working chambers of said first structure through a fluid passage and an actuator means for selectively opening and closing said fluid passage, said further fluid-filled working chamber damping a second predetermined vibration transmission when said actuator means opens said fluid passage, said second structure being mounted to an outer portion of said casing of said first structure; and
    a bracket through which said casing of said first structure is connected to said vehicle chassis, said bracket surrounding entirely the second structure outside of said casing of said first structure.

2. A power unit mounting device as claimed in claim 1, in which said bracket comprises a box-shaped member having an aperture, a part of said casing of said first structure being tightly inserted in said aperture.

3. A power unit mounting device as claimed in claim 2, wherein said part of said casing is bolted to said box-shaped bracket.

4. A power unit mounting device as claimed in claim 3, wherein said shaft of said first structure is connected to said power unit and wherein said bracket is connected to said vehicle chassis.

5. A power unit mounting device as claimed in claim 1, wherein said fluid-filled working chambers of said first structure comprise a main working chamber and a first auxiliary working chamber in fluid communication with each other, and wherein said further fluid-filled working chamber of said second structure comprises a second auxiliary working chamber.

6. A power unit mounting device as claimed in claim 5, wherein said actuator means of said second structure comprises a valve means operatively disposed in said fluid passage and a solenoid responsive to a control signal from a controller for operating said valve means.

7. A power unit mounting device as claimed in claim 6, wherein said valve means include a rotary valve having a first valve position opening said fluid passage and a second valve position closing said fluid passage, and wherein said solenoid includes an output shaft connected to said rotary valve for permitting said rotary valve to switch between said first and second valve positions.

8. A power unit mounting device as claimed in claim 7, wherein said rotary valve includes a rotor connected to the output shaft of said solenoid and a cylindrical member surrounding the rotor.

9. A power unit mounting device as claimed in claim 7, wherein said second auxiliary working chamber comprises a diaphragm surrounding said rotary valve within said bracket.

10. A power unit mounting device as claimed in claim 9 further comprising a case, defining an air chamber between said case and said diaphragm, for housing said valve means.

11. A power unit mounting device as claimed in claim 6, wherein said fluid passage communicates with said first and second auxiliary working chambers through first and second orifices, respectively.

12. A power unit mounting device as claimed in claim 1, wherein said bracket connects said first structure to said power unit.

13. A power unit mounting device for an automotive vehicle for damping vibration transmitted from a power unit to a vehicle chassis, comprising:
    a plurality of working chambers filled with a working fluid, said working chambers including main, first auxiliary and second auxiliary working chambers, said main working chamber being in fluid communication with said first and second auxiliary working chambers through a fluid passage;
    an actuator operable to adjust transmission of vibration, inputted from the power unit, between said working chambers through the working fluid for varying damping characteristics exhibited by the power unit mounting device, said actuator including valve means and a solenoid, said solenoid being responsive to a control signal from a controller to operate said valve means for selectively establishing a blocking fluid communication between the fluid passage and said second auxiliary working chamber, said valve means including a rotary valve having a first valve position establishing the fluid communication between the fluid passage and the second auxiliary working chamber and a second valve position blocking said fluid communication between the fluid passage and the second auxiliary working chamber and a second valve position blocking said fluid communication, said solenoid including an output shaft connected to the rotary valve for switching between the first and second valve positions; and
    a bracket supporting the power unit mounting device on the vehicle chassis, said bracket surrounding said actuator,
    wherein said second auxiliary working chamber is defined by a diaphragm surrounding said rotary valve within said bracket.

14. A power unit mounting device as claimed in claim 13 further comprising a case, defining an air chamber between said case and said diaphragm, for housing said valve means.

* * * * *

UNITED STATES PATENT AND TRADEMARK OFFICE
CERTIFICATE OF CORRECTION

PATENT NO. : 5,423,511
DATED : June 13, 1995
INVENTOR(S) : Hajime Takeguchi

It is certified that error appears in the above-indentified patent and that said Letters Patent is hereby corrected as shown below:

Title page, item [75], inventor: should read--Hajime Takeguchi, Kanagawa, Japan--.

Signed and Sealed this

Seventeenth Day of December, 1996

Attest:

BRUCE LEHMAN

*Attesting Officer*    *Commissioner of Patents and Trademarks*